United States Patent Office.

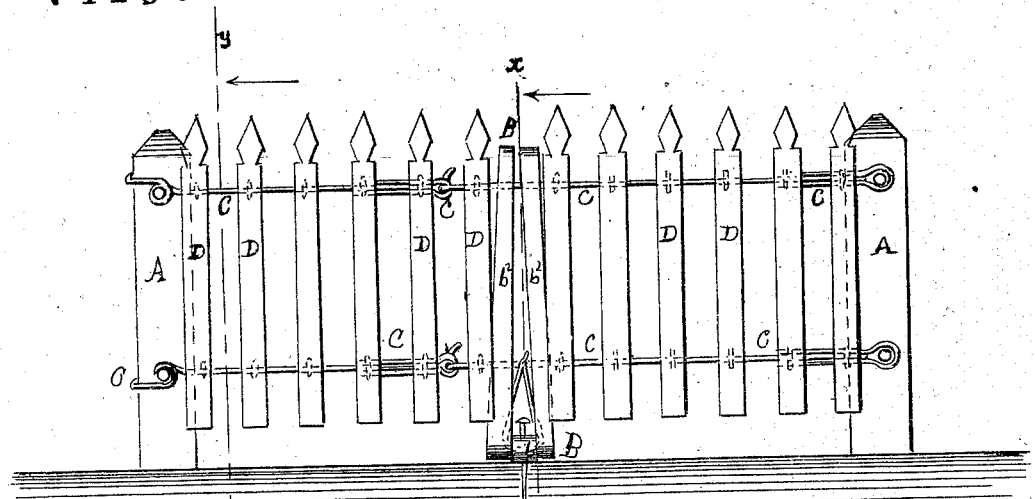
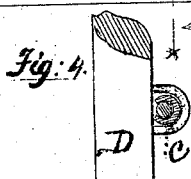
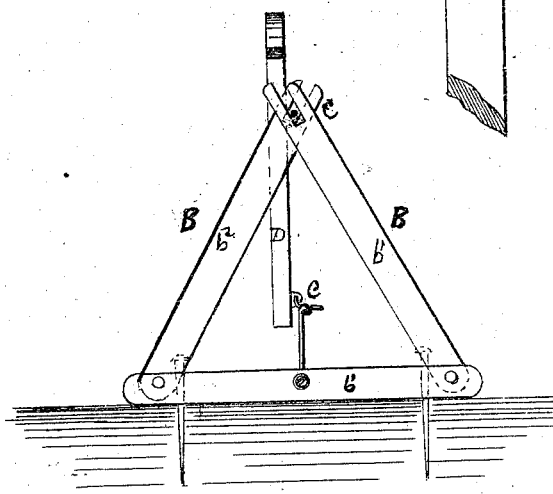
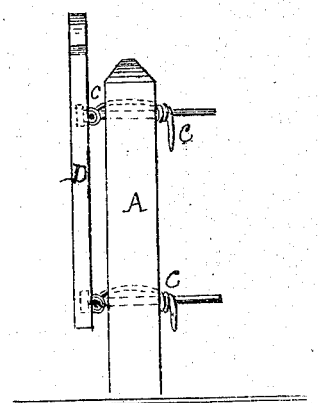

H. A. STEWART, OF MINNEAPOLIS, MINNESOTA.

Letters Patent No. 74,166, dated February 4, 1868.

IMPROVEMENT IN PORTABLE FENCES.

*The Schedule referred to in these Letters Patent and making part of the same.*

TO ALL WHOM IT MAY CONCERN:

Be it known that I, H. A. STEWART, of Minneapolis, in the county of Hennepin, and State of Minnesota, have invented a new and useful Improvement in Portable Fence; and I do hereby declare that the following is a full, clear, and exact description thereof, which will enable those skilled in the art to make and use the same, reference being had to the accompanying drawings, forming part of this specification, in which—

Figure 1 is a side view of a portion of my improved fence.
Figure 2 is a vertical cross-section of the same, taken through the line $x\ x$, fig. 1.
Figure 3 is a vertical cross-section of the same, taken through the line $y\ y$, fig. 1.
Figure 4 is a detail sectional view, enlarged, showing one manner of attaching the pickets.

Similar letters of reference indicate corresponding parts.

My invention has for its object to furnish an improved portable fence, simple and cheap in construction, durable, easily taken down, set up, or transported from place to place, and which, when not in use, can be packed for storage in a very small space; and it consists in an improved fence formed in sections, by attaching pickets to tarred ropes of suitable length, and in the combination therewith of supports formed by the combination of three bars with each other, the whole being constructed and arranged as hereinafter more fully described.

A are posts, which are securely set in the ground at each end of the fence, and which have pins passed through or secured to them for convenience in attaching the ropes. The intermediate parts of the fence are supported by the supports B, formed by the horizontal bar $b^1$, to the sides of the ends of which are pivoted the ends of the inclined side bars $b^2$, so that they, when not in use, may be folded down upon the horizontal base-bar $b^1$, for convenience in transportation or storage. The upper ends of the bars $b^2$ are notched to receive the upper rope, and the lower rope is connected with the base-bar $b^1$ by a loop of tarred rope, passing around the said rope and through a hole in the middle part of the said base-bar $b^1$. The base-bar $b^1$ may be pinned to the ground, or may sit loosely upon it, as may be desired. C are the ropes, which are tarred in the same manner as the ropes of a ship's rigging, to preserve them from the action of the weather. Upon one end of the ropes C are formed loops, and upon their other ends are formed knots, for convenience in attaching them to the posts A and to each other. D are the pickets, which are secured to the ropes C by staples, passing around the said ropes and driven into the said pickets, or in any other convenient and substantial manner. In case staples are used, small pieces of leather should be interposed between the said staples and the said ropes, to prevent the staples from cutting the ropes, and also to prevent the corrosive action of the iron rust. The ropes C should be of such a length that the bundles, formed by rolling up the sections of fence, may be of such a size as to be readily handled.

In setting up the fence, the loops formed upon the ends of the ropes C, of the first section, are passed over the pins attached to one of the posts, A, or otherwise secured to said posts. The knots at the ends of said ropes are then passed through the loops of the next section, and so on until the other post, A, is reached, to which the ropes C are secured. The supports B are then arranged in place, at suitable distances apart, and the fence is completed.

It should be observed that, by adjusting the position of the ropes C, the pickets D may be made to stand vertical, even in passing over uneven ground, which gives to my improved fence a great advantage over other movable fences.

I claim as new, and desire to secure by Letters Patent—

1. The combination of the supports B, constructed as described, with the sections of fence, as and for the purpose herein set forth.

2. In combination with the pivoted supports, constructed as described, the section of the fence, consisting of the pickets D, upon the tarred ropes C, as herein shown and described.

H. A. STEWART.

Witnesses:
DAVID MORGAN,
J. W. STEED.